United States Patent [19]
Ogata

[11] Patent Number: 5,613,407
[45] Date of Patent: Mar. 25, 1997

[54] HANDGRIP WITH BUILT-IN HEATER FOR MOTORCYCLE

[75] Inventor: Toru Ogata, Shizuoka, Japan

[73] Assignee: Koito Manufacturing Co., Ltd., Tokyo, Japan

[21] Appl. No.: 503,289

[22] Filed: Jul. 17, 1995

[30] Foreign Application Priority Data

Jul. 15, 1994 [JP] Japan ................................. 6-163826

[51] Int. Cl.$^6$ ................................. B62K 21/26; H05B 3/54
[52] U.S. Cl. ........................ 74/551.9; 74/558.5; 219/204
[58] Field of Search ................................. 74/551.8, 551.9, 74/558, 558.5; 219/204, 528; 439/34, 928

[56] References Cited

U.S. PATENT DOCUMENTS

| | | | |
|---|---|---|---|
| 4,471,209 | 9/1984 | Hollander | 74/551.9 |
| 4,547,655 | 10/1985 | Kurata et al. | 219/204 |
| 4,549,069 | 10/1985 | Oge | 219/204 |
| 4,829,223 | 5/1989 | Broberg et al. | 439/34 |
| 5,444,228 | 8/1995 | Gelus | 219/528 |

FOREIGN PATENT DOCUMENTS

| | | | |
|---|---|---|---|
| 804757 | 11/1936 | France | 74/551.9 |
| 0145264 | 6/1989 | Japan | 74/551.9 |
| 5-60996 | 8/1993 | Japan . | |

*Primary Examiner*—Charles A. Marmor
*Assistant Examiner*—MaryAnn Battista
*Attorney, Agent, or Firm*—Morgan, Lewis and Bockius LLP

[57] ABSTRACT

A handgrip with a built-in heater for a motorcycle in which an FPC heater is integrally embedded in a hollow cylindrical handgrip body made of rubber and exteriorly fitted to a handle pipe of a motorcycle. A heater circuit region of the handgrip body is constituted by a synthetic resin inner piece of a substantially hollow cylindrical shape with a hollow cylindrical or peripheral portion slotted, a plurality of grooves communicating with each other are formed on an inner peripheral surface of the inner piece, a rubber layer for making pressure contact with a pipe, formed integrally with a cladding rubber layer for covering the FPC heater extending on the outer peripheral surface of the inner piece, is filled in the grooves, and the inner piece is split into a plurality of pieces. Hence, the formation of the grooves on the inner peripheral surface of the inner piece is facilitated.

16 Claims, 8 Drawing Sheets

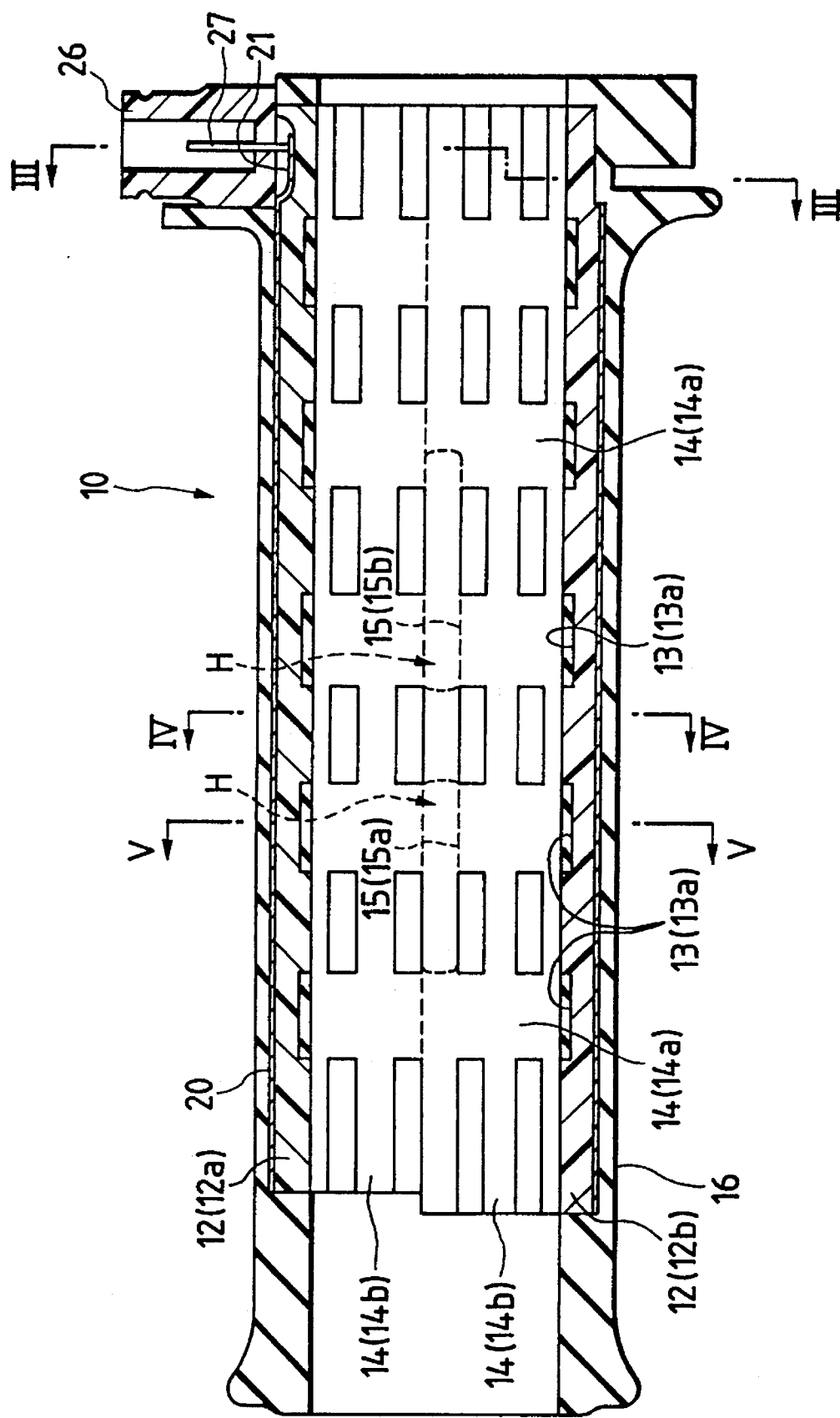

ance with the present invention, there is provided a hand-
HANDGRIP WITH BUILT-IN HEATER FOR MOTORCYCLE

BACKGROUND OF THE INVENTION

The present invention relates to a handgrip with a built-in heater and intended for use on a motorcycle or the like. More particularly, the invention relates to a handgrip with a built-in flexible printed circuit heater circuit (hereafter simply referred to as an FPC heater), which is a planar heater.

Conventionally, it has been known to incorporate a planar heater into the handgrips of a handlebar of a motorcycle to heat the handgrips as needed.

FIGS. 12 and 13 are cross-sectional views illustrating an example of a handgrip with a built-in heater of this type. (See Japanese Utility Model Application Laid-Open No. 60996/1993). Reference numeral 1 denotes a handgrip body which can be integrally fitted over and secured to a handle pipe 2 as the handle pipe 2 is inserted into the handgrip body 1. The handgrip body 1 has a structure in which a cladding layer 5 made of soft rubber is molded integrally over the outer periphery of a synthetic resin inner piece 3 having a semicircular cross section as well as appropriate rigidity, and around which an FPC heater 4 is wound. A rubber layer 6 for making pressure contact with the pipe is provided on the inner peripheral surface of the inner piece 3, thereby making it possible to positively hold and fix the handgrip body 1 onto the handle pipe 2.

With the handgrip shown in FIGS. 12 and 13, however, the FPC heater 4 extends around only about half the circumference of the handgrip 1 body, so that only about half the area of the handgrip body 1 is directly warmed.

To overcome this problem, as shown in FIG. 14, a handgrip with a built-in heater has been proposed in which an FPC heater 4 is wound around the outer peripheral surface of a substantially hollow cylindrical inner piece 3 having a peripheral portion 3a which is slotted, and the cladding rubber layer 5 is molded thereon. Also, though not shown, a handgrip with a built-in heater in which the inner piece 3 is formed in a hollow cylindrical shape has been proposed. Since the FPC heater 4 extends substantially over the entire periphery of the handgrip body, the rider's hand gripping the handgrip can be warmed efficiently.

In FIG. 14, reference numeral 7 denotes grooves which extend circumferentially and axially on the inner peripheral surface of the inner piece 3. The rubber layer 6 for making pressure contact with the pipe is filled in these grooves 7.

With the above-described conventional handgrip heater shown in FIG. 14, the grooves 7 filled by the rubber layer 6 for making pressure contact with the pipe need to be formed on the inner peripheral surface of the inner piece 3. However, since the inner piece 3 is of a hollow cylindrical or a substantially hollow cylindrical configuration, it is very difficult to form the grooves 7. The manufacture of a handgrip with a built-in heater has been troublesome for this reason.

SUMMARY OF THE INVENTION

The present invention has been made in view of the above-described problems of the conventional art, and an object thereof is to provide a handgrip with a built-in heater for a motorcycle which makes it possible to warm the entire handgrip, which makes it difficult for disconnection or breakage to occur in the FPC heater during installation on the handle pipe (throttle pipe) or during use, which can be positively integrated with the handle pipe (throttle pipe), and which is easy to manufacture.

To attain the above-described and other objects, in accordance with the present invention, there is provided a handgrip with a built-in heater for a motorcycle in which a flexible printed circuit heater circuit is integrally embedded in a hollow cylindrical handgrip body made of rubber which is exteriorly fitted to a handle pipe or a throttle pipe of a motorcycle, wherein a region of the handgrip body in which a heater circuit is disposed is constituted by a synthetic resin inner piece of a substantially hollow cylindrical shape with a slotted hollow cylindrical or peripheral portion, that a plurality of grooves communicating with each other are formed on an inner peripheral surface of the inner piece, that a rubber layer for making pressure contact with a pipe, formed integrally with a cladding rubber layer for covering the flexible printed circuit heater circuit extending on an outer peripheral surface of the inner piece, is filled in the grooves, and that the inner piece is split into a plurality of pieces as viewed in a circumferential direction.

Further, notches may be formed at joining ends of the split pieces of the inner piece, and the cladding rubber layer and the rubber layer for making pressure contact with a pipe are coupled to each other by means of a rubber layer filled in the notches.

The synthetic resin inner piece of a hollow cylindrical or substantially hollow cylindrical type, which excels in heat insulation, suppresses the escape of heat generated by the FPC heater toward the handle pipe (throttle pipe) side. The synthetic resin inner piece, which is unlikely to become deformed, unlike rubber, prevents deformation of the handgrip body due to an external force, and hence prevents deformation of the FPC heater.

The rubber layer for making pressure contact with the pipe, which is filled in the grooves formed on the inner peripheral surface of the inner piece, withstands the tearing force of the inserting end of the pipe when the handle pipe (throttle pipe) is inserted into the inner piece. At the same time, the rubber layer for making pressure contact with the pipe is brought into pressure contact with the inserted handle pipe (throttle pipe), thereby positively preventing the inner piece from sliding with respect to those pipes.

The inner piece is split into a plurality of pieces as viewed in the circumferential direction, so that the grooves for filling the rubber layer for making pressure contact with the pipe can be easily formed in these individual split pieces of the inner piece.

Further, the rubber layer filled in an opening formed by the notches in the inner piece serves to couple the cladding rubber layer on the outer side of the inner piece and the rubber layer for making pressure contact with the pipe, thereby suppressing peeling of the rubber layer.

BRIEF DESCRIPTION OF THE DRAWINGS

FIG. 2 is a vertical cross-sectional view of a handgrip body, which is an essential portion of the handgrip;

DESCRIPTION OF THE PREFERRED EMBODIMENTS

Figure 1:
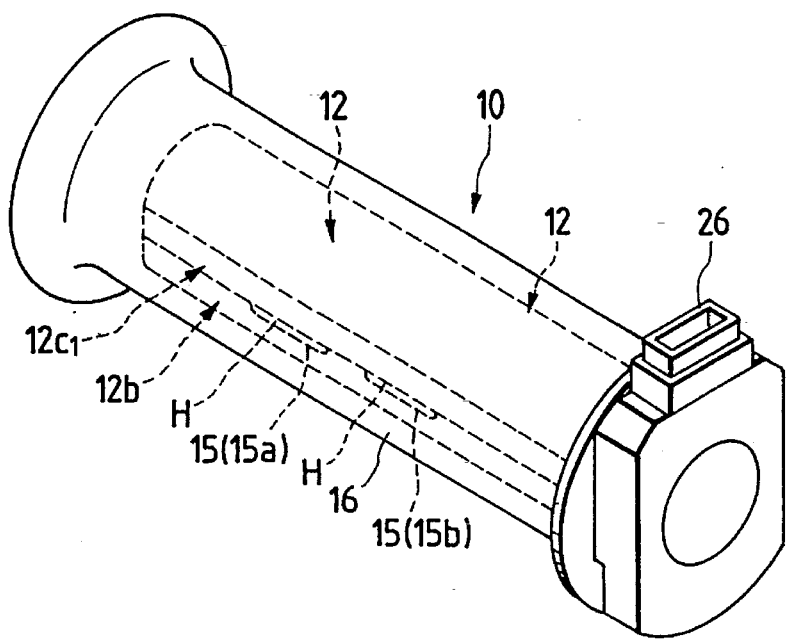
FIG. 1 is a perspective view illustrating an embodiment of a handgrip with a built-in heater for a motorcycle constructed in accordance with the present invention.

Referring now to the drawings, a description will be provided of preferred embodiments of the present invention.

Figure 3:
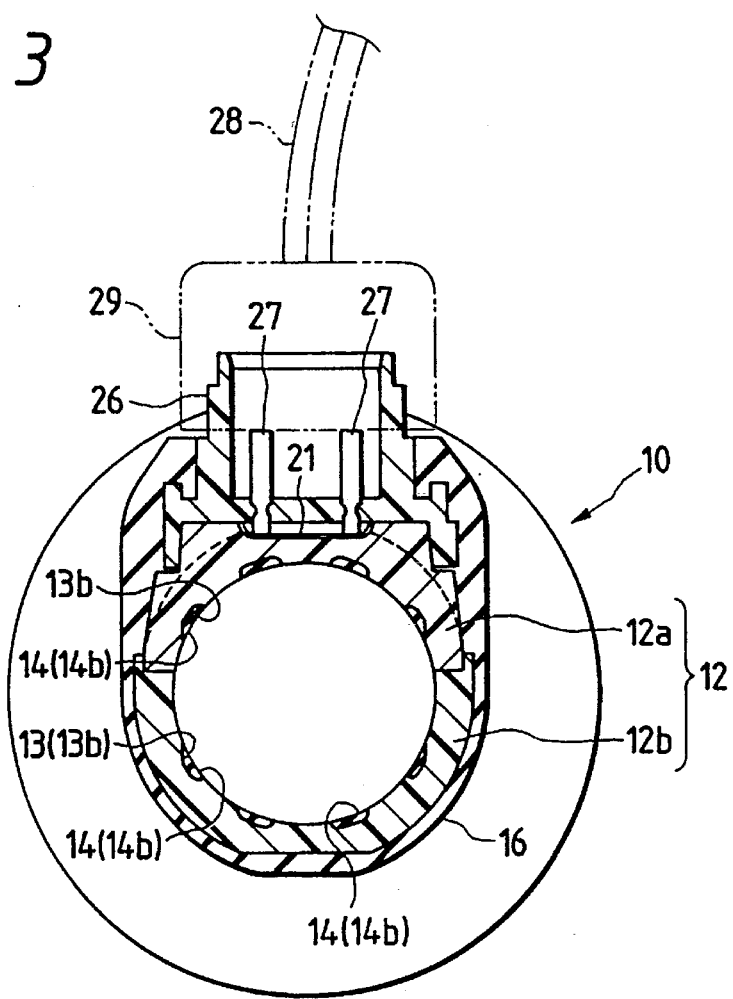
FIG. 3 is a horizontal cross-sectional view of the handgrip body (a cross-sectional view taken along line III—III shown in FIG. 2)
Figure 4:
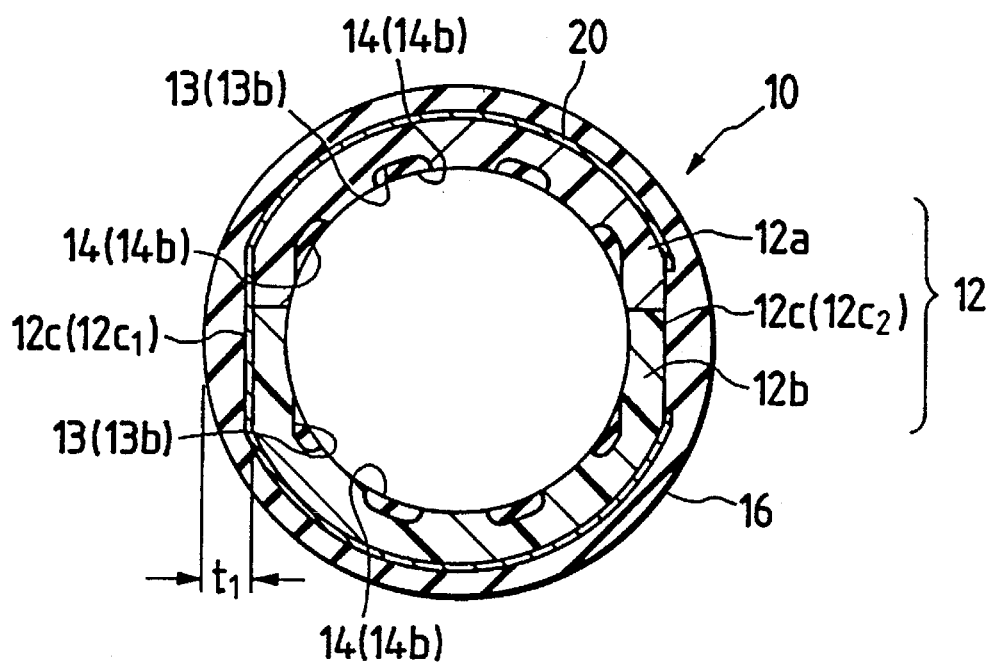
FIG. 4 is a horizontal cross-sectional view of the handgrip body (a cross-sectional view taken along line IV—IV shown in FIG. 2)
Figure 5:
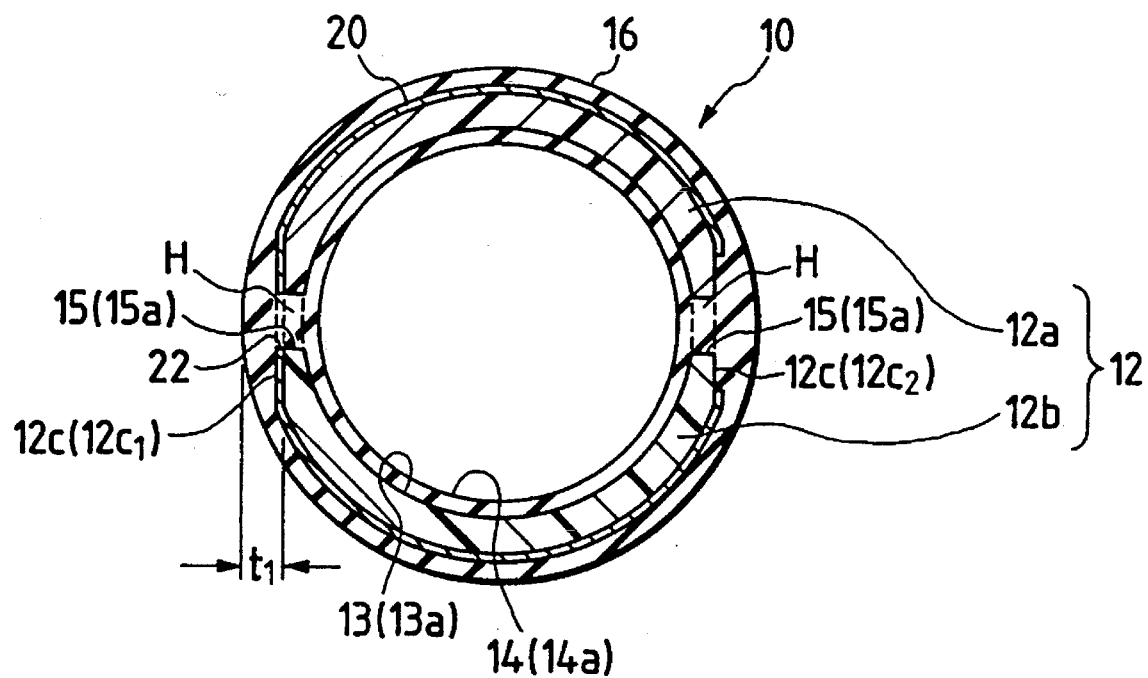
FIG. 5 is a horizontal cross-sectional view of the handgrip body (a cross-sectional view taken along line V—V shown in FIG. 2)
Figure 6:
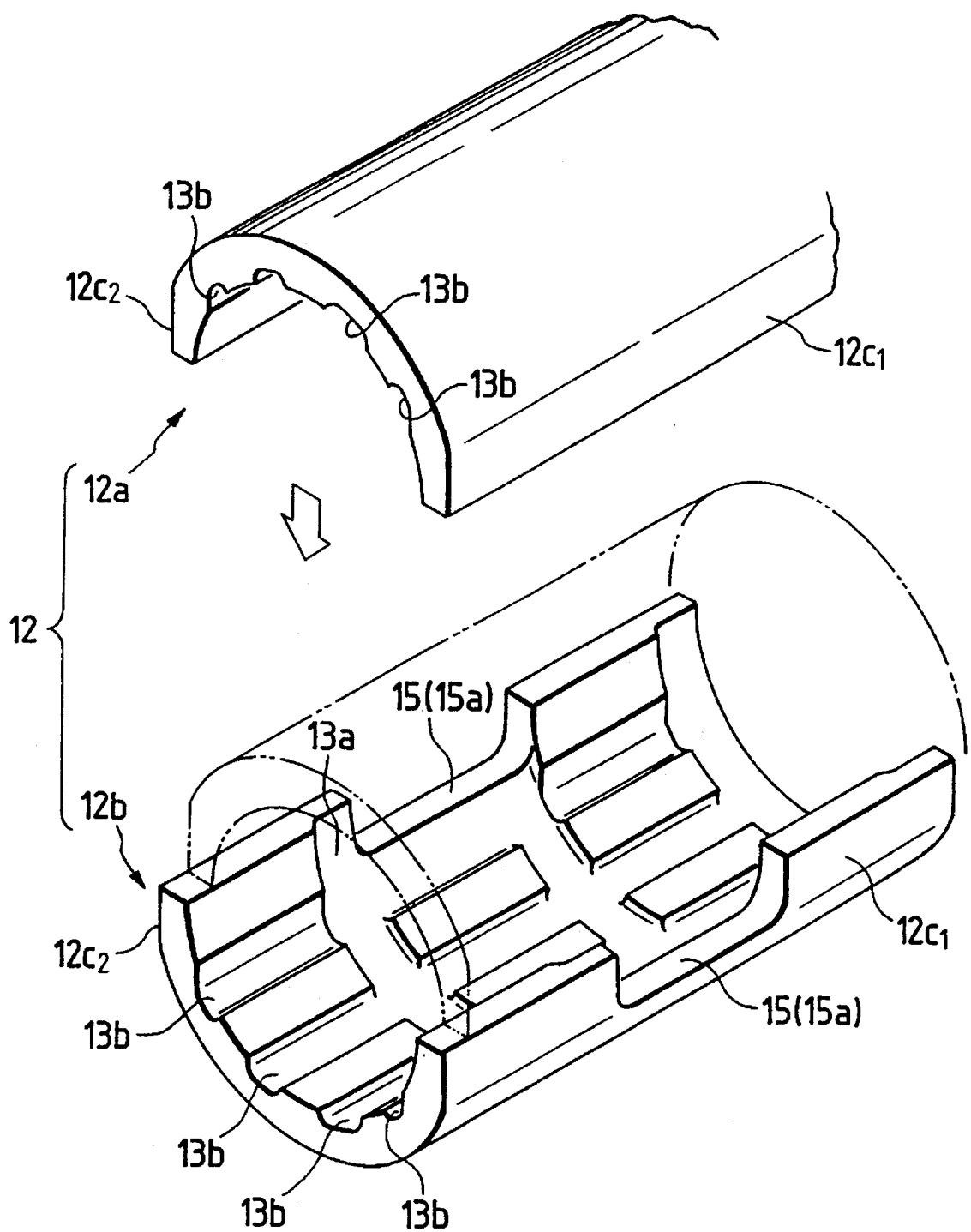
FIG. 6 is an enlarged perspective view of an inner piece according to the invention.
Figure 7:
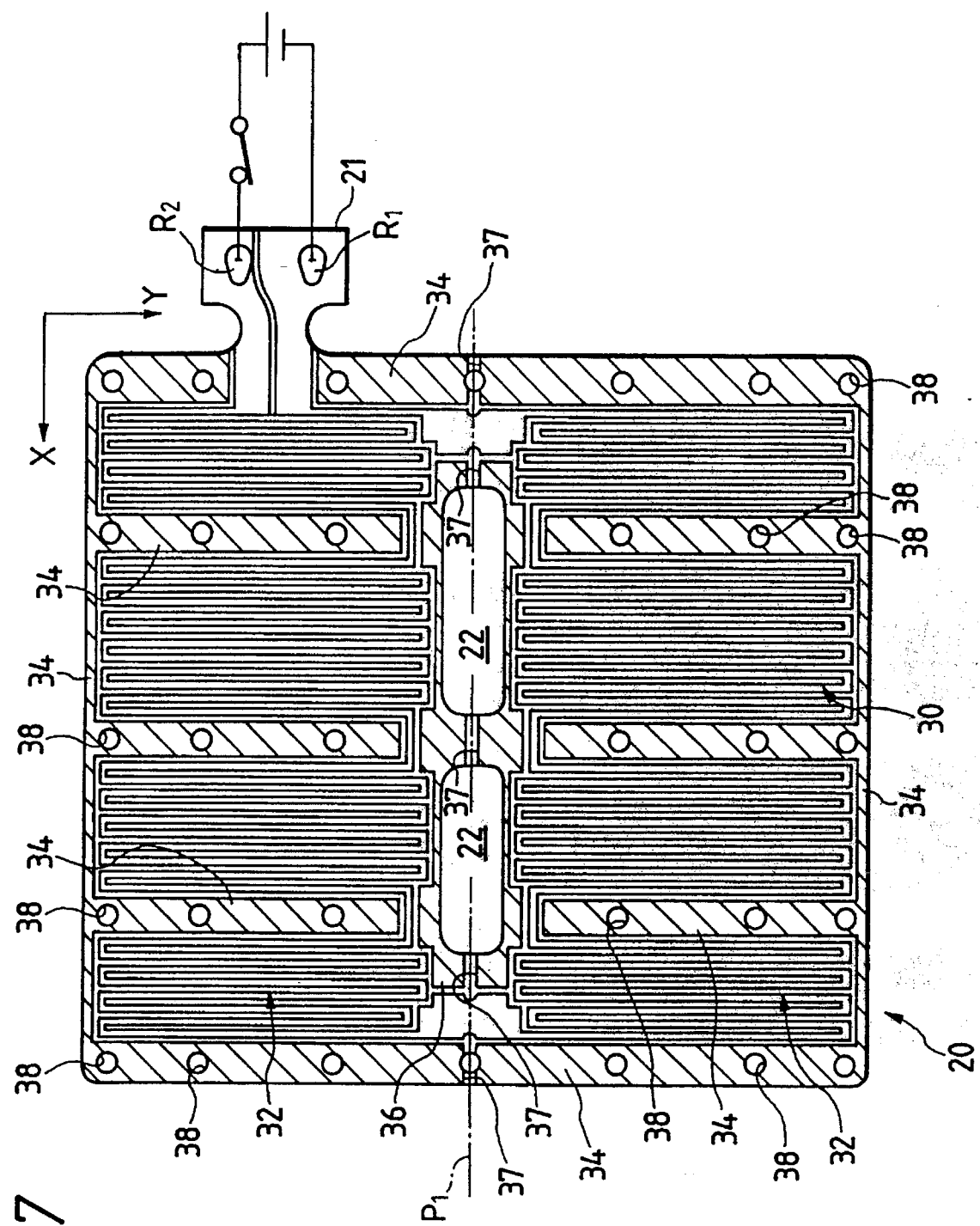
FIG. 7 is a diagram illustrating a flexible printed circuit heater circuit before being wound around the inner piece, as well as the electric circuit thereof.
Figure 8:
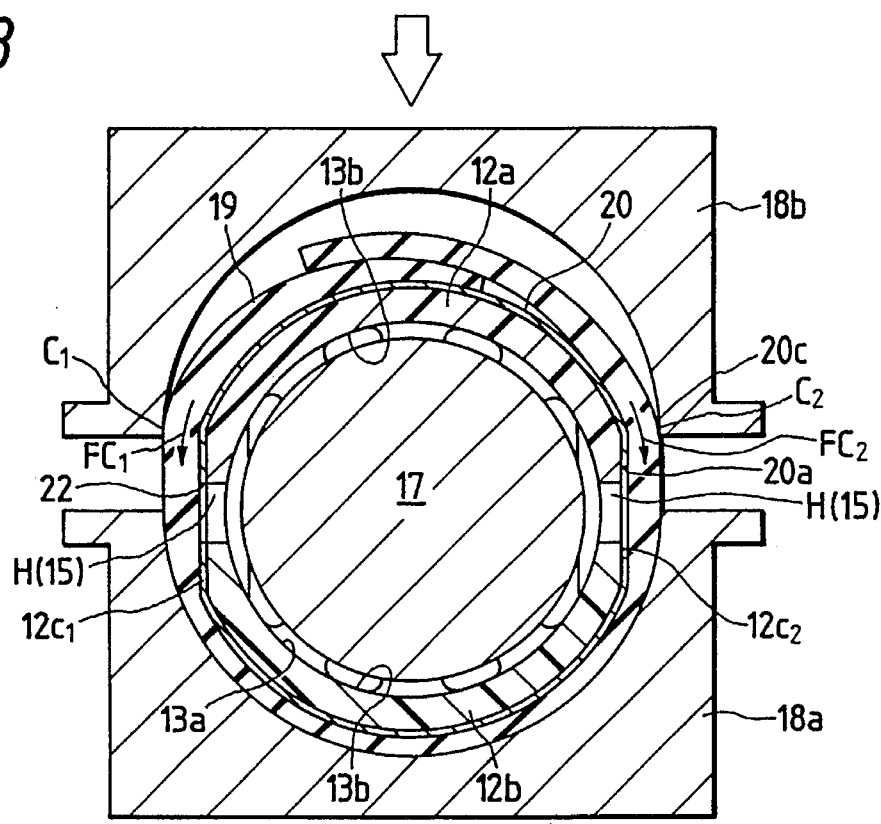
FIG. 8 is an explanatory diagram illustrating the manner in which the handgrip body is molded.
Figure 9:
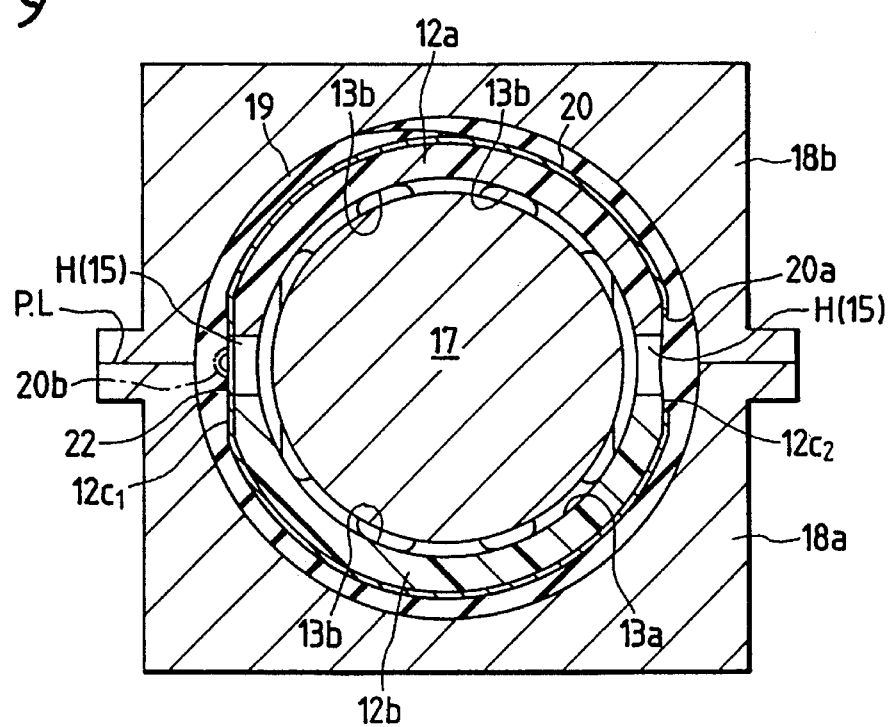
FIG. 9 is an explanatory diagram illustrating the manner in which the handgrip body is molded.
Figure 10:
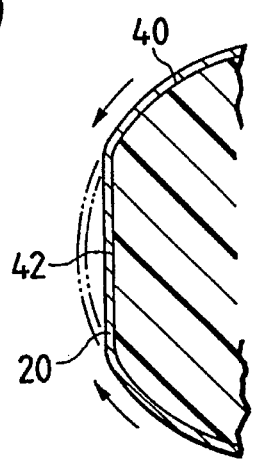
FIG. 10 is an explanatory diagram illustrating the slackening of the FPC heater at the position of a chamfered flat surface.

FIG. 1 is a perspective view illustrating an embodiment of a handgrip with a built-in heater for a motorcycle. FIG. 2 is a vertical cross-sectional view of a handgrip body, which is an essential portion of the handgrip. FIGS. 3 to 5 are horizontal cross-sectional views of the handgrip body (cross-sectional views taken along lines III—III, IV—IV, and V—V shown in FIG. 2). FIG. 6 is an enlarged perspective view of an inner piece. FIG. 7 is a diagram illustrating a flexible printed circuit heater circuit prior to winding around the inner piece, as well as the electric circuit thereof. FIGS. 8 and 9 are explanatory diagrams illustrating the manner in which the handgrip body is molded. FIG. 10 is an explanatory diagram illustrating the slackening of the FPC heater at the position of a chamfered flat surface.

In these drawings, reference numeral 10 denotes a handgrip body of a hollow cylindrical type whose surface is clad with rubber. This handgrip body 10 is exteriorly fitted and secured to a handle pipe or throttle pipe of a motorcycle. The handgrip body 10 is structured such that a flexible printed circuit heater circuit (hereafter referred to as the FPC heater) 20 is wound on the outer side of a synthetic resin inner piece 12 of a hollow cylindrical shape, and a cladding rubber layer 16 is integrally molded thereon to cause the FPC heater 20 to extend between the inner piece 12 and the cladding rubber layer 16.

A belt-shaped rubber layer 14 (including rubber layer portions 14a extending circumferentially and rubber layer portions 14b extending axially) for making pressure contact with the pipe, which is coupled integrally to the cladding rubber layer 16 and extends circumferentially and axially, is formed on the inner peripheral surface of the inner piece 12. This rubber layer 14 is filled in grooves 13 (grooves 13a extending circumferentially and grooves 13b extending axially) which communicate with notches 15 (15a, 15b) provided in a side wall of the inner piece 12. The rubber layer 14, which is formed flush with the inner peripheral surface of the inner piece 12, serves to increase the adhesive strength between the handgrip body 10 and the handle pipe (or throttle pipe) by being brought into pressure contact with the handle pipe inserted in the inner piece 12.

The rubber layer 14 may be formed to a height at which the rubber layer 14 projects slightly inward from the inner peripheral surface of the inner piece 12. In this case, a small air layer is formed between the inner peripheral surface of the inner piece and the handle pipe (or throttle pipe). In this case, the structure is such that heat on the handgrip body 10 side can be prevent from escaping to the handle pipe (or throttle pipe) side.

In addition, the rubber layer 14 is filled in the grooves 13 with an adhesive agent applied thereto, and is firmly bonded and secured to the grooves 13. Therefore, when the handle pipe or the throttle pipe is inserted into the handgrip body 10, there is no danger of the rubber layer 14 being torn by the inserting end of the handle pipe (throttle pipe).

Since the inner piece 12 has a hollow cylindrical shape, it is very difficult to form the grooves 13 for receiving the rubber layer on the inner peripheral surface of the inner piece. In this embodiment, however, the inner piece 12 has a structure whereby it is split into two parts in the circumferential direction (split into an upper split piece 12a and a lower split piece 12b). Hence, it is easy to form the grooves 13 (13a, 13b) for forming the rubber layer on the respective inner peripheral surfaces of the split pieces 12a and 12b each having a semicircular cross section. Namely, it is easy to mold the split pieces 12a and 12b of the synthetic resin-made inner piece by injection molding or press molding using a mold provided with protrusions for forming the grooves 13 on its molding surface, or to form the grooves 13 on the inner peripheral surface of the split pieces of the synthetic resin-made inner piece by cutting.

The notches 15 (15a, 15b) are respectively formed in left- and right-hand side edges of the lower split piece 12b, which is a constituent member of the inner piece. As the lower split piece 12b and the upper split piece 12a are engaged with each other to form the inner piece 12 of the hollow cylindrical type, the notches 15a form openings H which are communicating holes for allowing the outer side and the inner side of the inner piece 12 to communicate with each other during the molding of the rubber layer. That is, the cladding rubber layer 16 and the rubber layer 14 for making pressure contact with the pipe are integrally coupled to each other by a rubber layer 50 filled in the openings H. Consequently, since offset between the cladding rubber layer 16 and the inner piece 12 can be reliably suppressed, there is no drawback in that the FPC heater 20, the cladding rubber layer 16, and the rubber layer 14 for making pressure contact with the pipe are peeled off the inner piece 12, thereby ensuring a structural strength sufficient to withstand extended periods of use.

In addition, although the inner piece 12 is formed into a hollow cylindrical shape, the structure provided is such that chamfered flat surfaces 12c (12$c_1$, 12$c_2$) are formed at portions of the inner piece 12 along the split position of the outer peripheral surface thereof (in regions along the joining portions of the split pieces 12a, 12b), and that the FPC heater 20 extends over the entire peripheral region of the inner piece excluding one flat surface 12$c_2$ of the opposing left- and right-hand flat surfaces 12$c_1$ and 12$c_2$, so as to warm the entire handgrip body 10.

In addition, in a case where a flat surface 42 is formed on an arcuate surface 40 by partially chamfering the arcuate surface 40, as shown in FIG. 10, if the FPC heater 20 wound around the arcuate surface 40 slackens, the FPC heater 20 is liable to become separated at the position of the flat surface 42, as shown by phantom lines (i.e., the FPC heater 20 slackens and a crease is liable to be formed in the FPC heater 20). However, in accordance with the invention, control is provided to cause the crease always to be formed only at the position of this flat surface $12c_1$, and the thickness of the cladding rubber layer 16 at the position of the flat surface $12c_1$ is set to a thickness sufficient to conceal the crease, as will be described in detail later.

In addition, the FPC heater 20 extending between the cladding rubber layer 16 and the inner piece 12 has a cross-sectional structure in which a copper foil strip pattern 30 is sandwiched between a base film and an overlay film. If the FPC heater 20 is unrolled, it is substantially square, as shown in FIG. 7. A lead portion 21 for connection to a power supply and which is led outside the handgrip is formed at one side edge of the FPC heater 20, as shown in FIGS. 2, 3, and 7. Formed on this lead portion 21 are two lands $R_1$ and $R_2$ where copper foils, connected to copper foil strips 32 arranged in a meandering manner and serving as a heat source, are exposed. Two terminals 27 of a male connector 26 (see FIGS. 2 and 3) abut the respective lands R1 and R2, while a female connector 29, provided at a distal end of a power cord 28 extending from a battery, i.e., the power supply, is connected to the terminals 27.

The male connector 26 engages the upper split piece 12a of the inner piece 12, and is molded integrally with the handgrip body 10 by means of the cladding rubber layer 16 covering the inner piece 12. When the cladding rubber layer 16 is molded on the outer side of the inner piece 12, the male connector 26 is also formed integrally with the inner piece 12. Reference numeral 38 denotes circular holes provided at regular pitches in the FPC heater 20 at positions where a reinforcing copper foil strip 34 is formed. Exfoliation of the FPC heater 20 is prevented since the cladding rubber layer 16 on the FPC heater 20 is made to adhere directly to the inner piece 12 in the circular holes 38.

In addition, the meandering copper foil strips 32 which constitute the heat source in the copper foil strip pattern 30 extend in the Y-direction, corresponding to the circumferential direction (the direction in which the FPC heater is wound) of the handgrip body perpendicular to the X-direction. This arrangement enhances the flexural rigidity of the copper foil strips 32 with respect to external forces acting in the circumferential direction of the handgrip body. Thus, in the process of molding the cladding rubber layer 16, a crease is unlikely to occur in the copper foil strips 32, which perform the heat-generating action of the FPC heater 20.

Around the copper foil strips 32, the reinforcing copper foil strip 34 extends along the outer edges of the FPC heater 20, and the reinforcing Copper foil strip 34 (indicated by oblique lines in FIG. 7) has portions extending in the Y-direction in the region where the copper foil pattern 32 is formed. As a result, the flexural rigidity of the FPC heater 20 is enhanced, thereby providing a structure in which the FPC heater 20 is unlikely to be deformed.

In addition, elongated holes 22, which are aligned with the openings H in the inner piece 12, are formed in a central portion, as viewed in the Y-direction, of the FPC heater 20. The FPC heater 20 is wound around and held on the inner piece 12 in a state in which the elongated holes 22 are aligned with the openings H, and the structure is such that in a case where a crease is formed in the FPC heater 20, the crease is concentrated in a position $P_1$ where the elongated holes 22 are formed. That is, the modulus of section at the position $P_1$ where the elongated holes are formed in the FPC heater 20 is smaller than the modulus of section at other positions parallel with the X-direction since the elongated holes 22 are provided. Accordingly, in the case where an external force sufficient to produce a crease in the FPC heater 20 occurs, a crease is produced only at the position $P_1$ where the elongated holes are formed.

Since the outer configuration of the cladding rubber layer 16 is circular, the thickness of the cladding rubber layer 16 at the positions of the chamfered flat surfaces 12c ($12c_1$, $12c_2$) of the inner piece 12 is greater than the thickness of the cladding rubber layer 16 at other portions (nonchamfered portions) of the outer peripheral surface of the inner piece. The position $P_1$ where the elongated holes 22 are formed in the FPC heater 20 (the portion where a crease is liable to occur due to the small flexural rigidity in the FPC heater 20) is located at the position of this flat surface $12c_2$. Hence, in the case where a crease is formed in the FPC heater 20, the crease occurs at the position of the flat surface $12c_1$ where the thickness of the cladding rubber layer 16 is sufficiently large. Therefore, even if a crease is fairly large (having a large height), the crease is concealed in the cladding rubber layer 16, so that the crease is not exposed outside the cladding rubber layer 16.

Furthermore, a copper foil strip 36 for reinforcing peripheral edge portions of the elongated holes 22 is provided, extending in the same direction as the elongated holes 22. Also, a belt-shaped region 37 where no copper foil is present is provided in parallel with the copper foil strip 36 so as to guide any crease occurring in the FPC heater 20 to the position where the elongated holes are formed. Namely, since the belt-shaped region 37 where no copper foil is formed and which extends in the direction of the elongated holes 22 is provided in the transverse central portion of the copper foil strip 36, the flexural rigidity at a position along the region 37 where no copper foil is formed at the position where the elongated holes 22 are formed is minimized. Hence, in a case where a crease 20b (see FIG. 9) occurs in the FPC heater 20, the crease will always be formed at the position $P_1$ along the elongated holes. The thickness $t_1$ (see FIGS. 4 and 5) of the cladding rubber layer 16 at this position $P_1$ is the largest in the thickness of the cladding rubber layer 16 corresponding to the flat surface $12c_1$, with the result that the crease is guided to the thickest portion of the cladding rubber layer 16, thereby making it possible to conceal the crease 20b.

In addition, to mold the cladding rubber layer 16 on the outer side of the inner piece 12 and the rubber layer for making pressure contact with the pipe on the inner side thereof, the cladding rubber layer 16 is molded such that the region where the FPC heater is not wound faces the mold-parting position, as shown in FIGS. 8 and 9. Consequently, a crease is unlikely to occur in the FPC heater 20 which extends along the inner piece 12. Namely, the FPC heater 20 is first wound around the inner piece 12 in which the upper and lower split pieces 12a and 12b are integrally engaged with each other, and a raw rubber sheet 19 is wound therearound before the FPC heater 20 is tentatively secured. Then, a core 17 is inserted into the inner piece 12, and this assembly is placed in a fixed mold half 18a.

As for the raw rubber sheet 19 used for tentatively securing the FPC heater 20, if a rubber-layer forming material (the raw rubber sheet 19) is accommodated in advance in the mold halves 18a and 18b, it is effective in forming the cladding rubber layer 16 and the pipe pressure-contacting rubber layer 14 with sufficient thicknesses to compensate for a shortage of molten rubber cast into the mold. Then, the movable mold half 18b is engaged with the fixed mold half 18a, and the mold is closed. During the closing of the mold, as shown in FIG. 8, portions of the raw rubber sheet 19 indicated by reference characters $C_1$ and $C_2$ are pressed by the movable mold half 19, so that a pair of external forces, indicated by reference characters $FC_1$ and $FC_2$ in FIG. 8, act on the FPC heater 20. However, these two external forces $FC_1$ and $FC_2$ acting on the FPC heater 20 are oriented in mutually opposite directions so that they offset each other. For this reason, the FPC heater 20 does not slide along the inner piece 12, thereby preventing a crease from occurring in the FPC heater 20. Additionally, this external force $FC_2$ acts in a direction opposite to the direction in which a side edge 20a of the FPC heater 20 is turned up, i.e., in the direction in which the side edge 20a is pressed along the surface of the inner piece 12 (in the direction in which the FPC heater is wound). Hence, the side edge 20a is held in close contact with the outer surface of the inner piece 12.

Upon completion of the closing of the mold, molten rubber is injected into the mold halves 18a and 18b through a gate (not shown) provided in the mold. The rubber in a molten state, which is supplied between the molding surface of the mold and the outer peripheral surface of the inner piece 12, passes through the openings H provided in the side wall of the inner piece 12, and flows smoothly into all portions of the grooves 13 (13a, 13b) on the inner side of the inner piece 12. Hence, since the mold temperature is sufficiently transmitted to the rubber filled in the grooves 13, the rubber layer 14 for making pressure contact with the pipe has no possibility of being insufficiently heated. Then, after the rubber is allowed to cool and set for a predetermined period of time, the mold is opened, thus obtaining a handgrip body 10 in which the cladding rubber layer 16 is integrally molded on the outer side of the inner piece 12, and the rubber layer 14 for making pressure contact with the pipe is integrally formed on the inner side thereof.

Although in the above-described embodiment the hollow cylindrical inner piece 12 is split into two portions as viewed in the circumferential direction, the inner piece is not limited to such a two-split structure, and it is sufficient if the inner piece has a structure in which it is split into a plurality of pieces, such as a three-split structure, a four-split structure, etc., as viewed in the circumferential direction.

Figure 11:
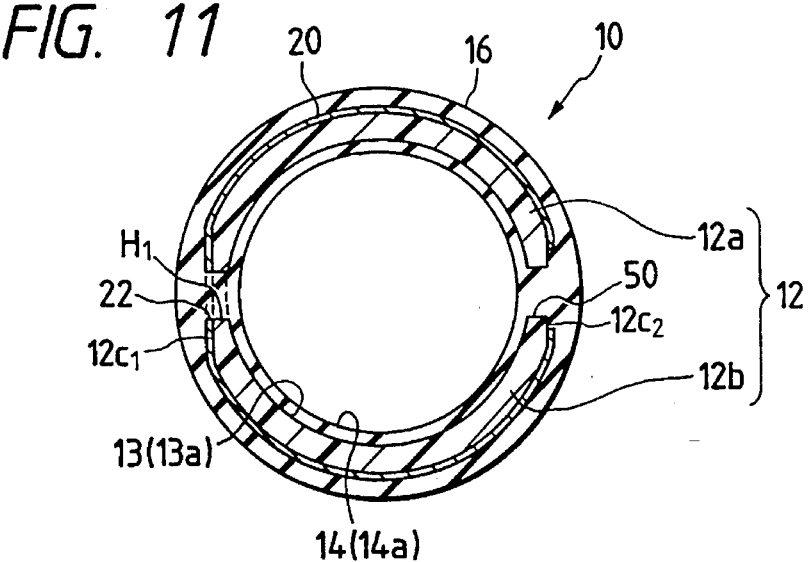
FIG. 11 is a horizontal cross-sectional view of a handgrip body, which is an essential portion of a second embodiment of the present invention.
Figure 12:
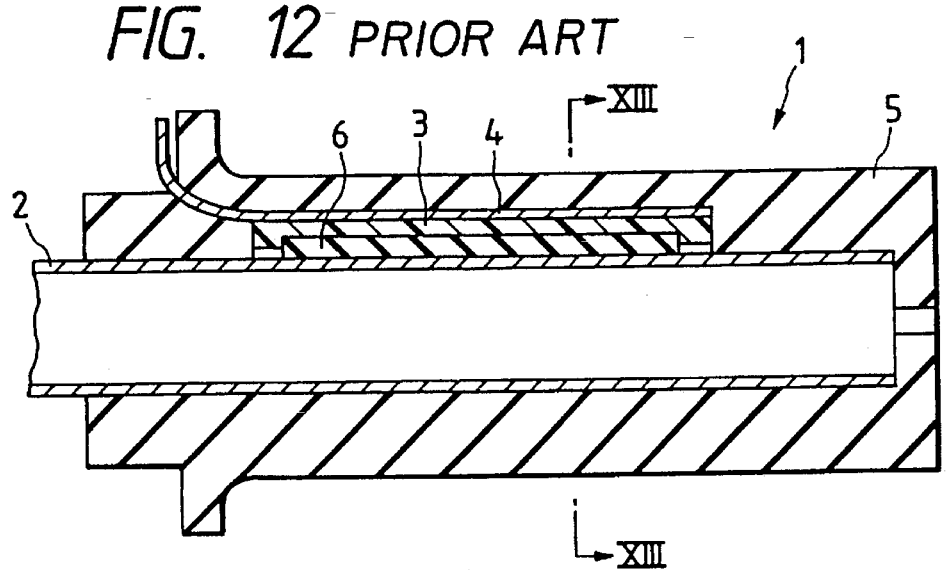
FIG. 12 is a horizontal cross-sectional view of a conventional handgrip with a built-in heater.
Figure 13:
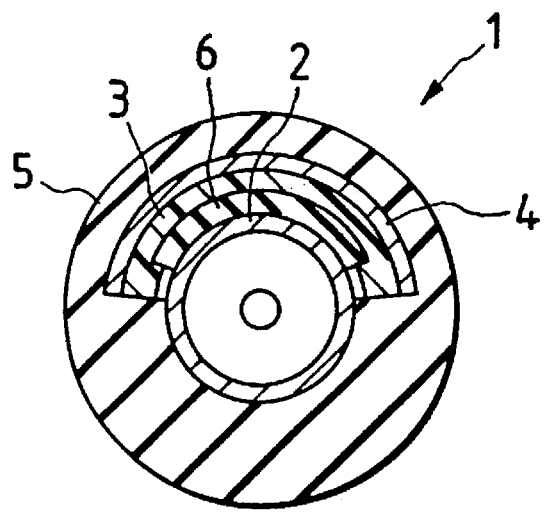
FIG. 13 is a cross-sectional view of the handgrip of FIG. 12 (a cross-sectional view taken along line XII—XII shown in FIG. 12)
Figure 14:
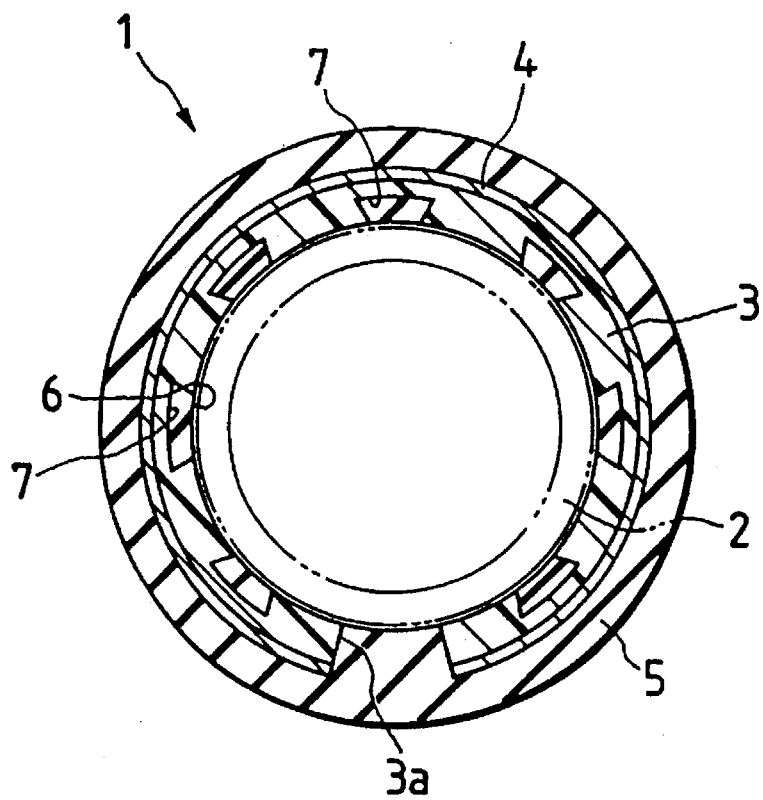
FIG. 14 is a horizontal cross-sectional view of another conventional handgrip with a built-in heater.

Although the inner piece 12 is of a hollow cylindrical construction, a substantially hollow cylindrical construction having a C-shaped cross section in which a part 50 of a peripheral portion is slotted, as shown in FIG. 11, may also be employed.

Reference character $H_1$ in FIG. 11 denotes an opening formed in the side wall (a position corresponding to the position where the slot 50 is formed) of the inner piece 12.

Although in the above-described embodiments the amount of molten rubber required to be injected into the mold is reduced by winding the raw rubber sheet 19 on the inner piece 12 with the FPC heater 20 wound therearound and by placing the assembly in the mold halves 18a and 18b, if an adhesive agent or another method is used for tentatively securing the FPC heater 20 to the inner piece 12, there is no need to use the raw rubber sheet 19.

As is apparent from the foregoing description, according to the handgrip with a built-in heater for a motorcycle of the present invention, since the synthetic resin inner piece of a hollow cylindrical or substantially hollow cylindrical shape excelling in heat insulation suppresses the escape of heat generated by the FPC heater toward the handle pipe (throttle pipe) side, it is possible to obtain a handgrip with a built-in heater which excels in heat retaining characteristics and which has high thermal efficiency.

In addition, the synthetic resin inner piece, which is unlikely to become deformed, unlike rubber, prevents the deformation of the handgrip body due to an external force, and hence prevents the deformation of the FPC heater. For this reason, even if the handgrip is gripped strongly when the rider grips the handgrip when in use, the FPC heater is unlikely to be deformed, so that breakage or disconnection is unlikely to occur in the FPC heater.

In addition, since the rubber layer for making pressure contact with the pipe is filled in the grooves formed on the inner peripheral surface of the inner piece, the rubber layer for making pressure contact with the pipe will not be torn when the handgrip is assembled onto the handle pipe (throttle pipe). In addition, the rubber layer for making pressure contact with the pipe, which is filled in the grooves formed on the inner peripheral surface of the inner piece, is brought into pressure contact with the handle pipe (throttle pipe) inserted into the handgrip body, allowing the inner piece to be secured to and held thereby. Hence, it is possible to form the handgrip with a built-in heater in such a manner that it is positively integrated with the handle pipe (throttle pipe).

In addition, the inner piece is split into a plurality of pieces as viewed in the circumferential direction, so that the grooves for filling the rubber layer for making pressure contact with the pipe can be easily formed in the individual split pieces of the inner piece. Therefore, the manufacture of the inner piece, and hence the manufacture of the handgrip with a built-in heater, is facilitated.

Moreover, since the cladding rubber layer on the outer side of the inner piece and the rubber layer for making pressure contact with the pipe are integrally coupled to each other by the rubber layer filled in the notches in the inner piece, it is possible to integrate the cladding rubber layer, the inner piece, and the rubber layer for making pressure contact with the pipe. Hence, it is possible to obtain a handgrip with a built-in heater in which the rubber layers are unlikely to be peeled off.

What is claimed is:

1. A handgrip with a built-in heater for a motorcycle, comprising:

an inner piece made of a synthetic resin and having a substantially hollow cylindrical shape, an opening formed in a peripheral portion of said inner piece, and a plurality of grooves communicating with each other being formed on an inner peripheral surface of said inner piece, said inner piece being split longitudinally into a plurality of pieces;

a flexible printed circuit heater wrapped around an outer peripheral surface of said inner piece;

a cladding rubber layer covering said flexible printed circuit heater; and a rubber layer for making pressure contact with a handle or throttle pipe of the motorcycle formed integrally with said cladding rubber layer, said rubber layer filling said grooves.

2. The handgrip with a built-in heater for a motorcycle according to claim 1, wherein notches serving as said opening are formed at joining ends of said split pieces of said inner piece.

3. The handgrip with a built-in heater for a motorcycle according to claim 2, further comprising a rubber coupling layer filled in said notches for coupling said cladding rubber layer with said rubber layer for making pressure contact with said pipe.

4. The handgrip with a built-in heater for a motorcycle according to claim 1, wherein said rubber layer for making pressure contact with said pipe projects slightly inward from said inner peripheral surface of said inner piece, whereby a small air layer is formed between said inner peripheral surface and said pipe.

5. The handgrip with a built-in heater for a motorcycle according to claim 1, further comprising an adhesive agent bonding said rubber layer for making pressure contact with said pipe to said grooves.

6. The handgrip with a built-in heater for a motorcycle according to claim 1, wherein a plurality of elongated holes are formed in a central portion of said heater aligned with corresponding openings in said inner piece.

7. The handgrip with a built-in heater for a motorcycle according to claim 1, wherein said heater comprises a copper foil strip pattern sandwiched between a base film and an overlay film.

8. The handgrip with a built-in heater for a motorcycle according to claim 7, wherein said copper foil strip pattern comprises a lead portion for making connection to a power supply, said lead portion being formed at one side edge of said heater, a pair of lands, a plurality of meandering conductors connected between said lands, and a pair of terminals connected to respective ones of said lands.

9. The handgrip with a built-in heater for a motorcycle according to claim 8, wherein said copper foil strip pattern further comprises a reinforcing copper foil strip, circular holes being formed in said reinforcing copper foil strip at a predetermined regular pitch.

10. The handgrip with a built-in heater for a motorcycle according to claim 8, further comprising a connector containing said pair of terminals, said connector engaging an upper split piece of said inner piece and being integrally molded with said handgrip by said cladding rubber layer.

11. The handgrip with a built-in heater for a motorcycle according to claim 10, wherein said meandering conductors extend in a circumferential direction of said handgrip.

12. The handgrip with a built-in heater for a motorcycle according to claim 11, wherein a reinforcing copper foil strip extends along outer edges of said heater, and said reinforcing copper foil strip having portions extending substantially parallel to said meandering conductors.

13. A handgrip with a built-in heater for a motorcycle comprising:

an inner piece made of a synthetic resin and having a substantially hollow cylindrical shape, an opening formed in a peripheral portion of said inner piece, and a plurality of grooves communicating with each other being formed on an inner peripheral surface of said inner piece, said inner piece being split longitudinally into a plurality of pieces;

a flexible printed circuit heater wrapped around an outer peripheral surface of said inner piece;

a cladding rubber layer covering said flexible printed circuit heater;

a rubber layer for making pressure contact with a handle or throttle pipe of the motorcycle formed integrally with said cladding rubber layer, said rubber layer filling said grooves, wherein chamfered flat surfaces are formed at portions of said inner piece along a split position of said outer peripheral surface.

14. A handgrip with a built-in heater for a motorcycle comprising:

an inner piece made of a synthetic resin and having a substantially hollow cylindrical shape, an opening formed in a peripheral portion of said inner piece, and a plurality of grooves communicating with each other being formed on an inner peripheral surface of said inner piece, said inner piece being split longitudinally into a plurality of pieces;

a flexible printed circuit heater wrapped around an outer peripheral surface of said inner piece;

a cladding rubber layer covering said flexible printed circuit heater;

a rubber layer for making pressure contact with a handle or throttle pipe of the motorcycle formed integrally with said cladding rubber layer, said rubber layer filling said grooves, wherein chamfered flat surfaces are formed at portions of said inner piece along a split position of said outer peripheral surface, wherein a plurality of elongated holes are formed in a central portion of said heater, said elongated holes being aligned with said chamfered flat surfaces in said inner piece.

15. The handgrip with a built-in heater for a motorcycle according to claim 14, wherein said heater includes a copper foil strip pattern comprising a reinforcing copper foil strip for reinforcing peripheral edge portions of said elongated holes extending in the same direction as said elongated holes.

16. The handgrip with a built-in heater for a motorcycle according to claim 15, wherein said heater comprises a belt-shaped region where no copper foil is present extending parallel to said reinforcing copper foil strip for reinforcing peripheral edge portions of said elongated holes.

* * * * *